United States Patent Office 3,268,288
Patented August 23, 1966

3,268,288
PROCESS FOR SOLUBILIZING URANIUM VALUES
Mayer B. Goren, Golden, Colo., assignor to Kerr-McGee Oil Industries, Inc., a corporation of Delaware
No Drawing. Filed July 19, 1963, Ser. No. 296,383
11 Claims. (Cl. 23—321)

This invention broadly relates to the solubilization of uranium values. In one of its more specific aspects, the invention further relates to an improved process for leaching uranium ores with aqueous mineral acid in the presence of ferric ion and/or pentavalent vanadium as an oxidant to aid in solubilizing the uranium values.

Uranium ores frequently contain uranium in the quadrivalent state as the silicate, phosphate, or carbon complex. The quadrivalent uranium is not amenable to leaching with a mineral acid and most acid leaching processes involve the addition of an oxidizing agent which oxides the uranium to the plus 6 valence state. The oxidized uranium is then readily attacked by the mineral acid and dissolved. The pH value of an aqueous mineral acid solution used in leaching uranium ore should be 0–0.5 initially in order to obtain solubilization of the uranium at a satisfactory rate. As the leach proceeds, the pH value gradually rises due to neutralization of the acid by the uranium ore and eventually the pH value is substantially above 0.5. Additional mineral acid may be added to adjust the pH to a low value giving a desirable rate of leach.

In the acid leaching of uranium ores in the presence of iron values, usually aqueous sulfuric acid containing an oxidant is intimately contacted with the ore to thereby oxidize the uranium content and solubilize it. When a vanadium-uranium ore is being leached, the resultant leach liquor contains both uranium and vanadium values in addition to iron values and other impurities.

The iron content of the leach liquor is generally in both ferrous and ferric forms and the ferric form can serve as an oxidant for the uranium values. A portion of the ferric ion content is reduced to ferrous ion during the leaching step, and if any vanadium values are present initially in the pentavalent oxidation state, they are at least partially reduced to the quadrivalent oxidation state. It is necessary to oxidize the ferrous ion to ferric ion and/or the quadrivalent vanadium values to the pentavalent oxidation state in order to have them function as oxidizing agents for the uranium values during the leach. Normally, the oxidation is effected by addition of a chemical oxidant such as sodium chlorate. This is expensive due to the high cost of chemical oxidants and lower cost substitutes have been sought for many years.

It is an object of the present invention to provide a novel process for solubilizing uranium values contained in uranium-bearing materials by treatment with aqueous mineral acid in the presence of ferric ion and/or pentavalent vanadium as an oxidant.

It is a further object to provide a novel process for oxidizing ferrous ion and/or quadrivalent vanadium to ferric ion and pentavalent vanadium, respectively, in a process for the acid leaching of uranium ores.

It is still a further object to provide a novel process for acid leaching uranium ores including recycle of leach liquor back to the leaching step, in which ferrous ion and/or quadrivalent vanadium is oxidized to ferric ion and pentavalent vanadium, respectively, by biological oxidation.

Still other objects and advantages of the invention will be apparent to those skilled in the art upon reference to the following detailed description and the examples.

In accordance with one important variant of the invention, material containing uranium in a valence state less than plus 6 is contacted with aqueous mineral acid containing one or more dissolved substances providing ferric ion and/or vanadium in the plus 5 oxidation state as an oxidant. The uranium values are solubilized and an aqueous solution or leach liquor is produced containing dissolved uranium values and ferrous ion and/or vanadium in the plus 4 oxidation state. The resulting leach liquor or a portion thereof may be contacted with a special strain of bacteria to be more specifically defined hereinafter to thereby oxidize the ferrous ion to the ferric state and, if desired, the vanadium values may be oxidized to the plus 5 valence state. The oxidized leach liquor now contains ferric ion and/or plus 5 vanadium and may be recycled to the leaching step to thereby oxidize and solubilize additional uranium values.

The leach liquor to be oxidized by the bacteria may or may not contain uranium values. If desired, the uranium values may be first recovered by a prior art process including solvent extraction or ion exchange, and the resulting uranium-barren solution containing ferrous iron and/or quadrivalent vanadium may be biologically oxidized and recycled back to the leaching step. Preferably, the pH value of the oxidized solution is adjusted by addition of concentrated mineral acid prior to or during recycle to the leaching step, and after biological oxidation has been effected.

Adjustment of the pH value to 0–0.5 results in inactivating or killing the bacteria, and it is therefore essential that the oxidation be effected prior to adjustment of pH to the value existing in the leaching circuit. However, upon contacting of the leach liquor with sufficient ore to raise the pH to a value between 0.8–0.9 and 3, or by neutralization with base or diluting the leach liquor with water to provide such a pH value, the bacteria thrive in the leach liquor and oxidation may be readily effected.

The bacteria useful in practicing the invention are non-spore forming, rod-shaped, motile, autotrophic oxidizing bacteria which have the ability to oxidize ferrous ion to ferric ion. The bacteria also have the ability to oxidize vanadium from lower valence states to the plus 5 oxidation state in some instances and the preferred strain of bacteria is capable of tolerating uranium and/or vanadium values. Usually, the bacteria are approximately 0.5 to 1.0 millimicron in width and 1 to 2 millimicrons in length, and derive their energy from the oxidation of ferrous iron or the oxidation of vanadium in valence states lower than plus 5, and perhaps to some extent by the oxidation of other substances such as sulfur which may be present. They are capable of using carbon dioxide as a source of carbon, and organic materials are not essential for their growth. They require an acidic aqueous medium for growth, but are unable to tolerate extremely low or extremely high pH values.

In their naturally occurring state, the bacteria seem to be substantially identical with *Ferrobacillus ferrooxidans*, *Thiobacillus ferrooxidans*, or oxidizing bacteria found in copper and iron-containing mine waters in the Brainard Lake area of Colorado and the Idaho Springs area of Colorado. The bacteria in their naturally occurring state do not appear to exhibit a tolerance to any substantial degree to appreciable concentrations of uranium or vanadium values.

The American Type Culture Collection, 2112 M St. NW., Washington 7, D.C., has given collection catalog number 13,661 to a strain of *Ferrobacillus ferrooxidans* and 13,598 to a strain of *Thiobacillus ferrooxidans* which may be used in developing the preferred strain of bacteria for practicing the present invention. The bacteria which occur in the mine waters mentioned above also may be used in developing a preferred strain of bacteria. However, all of these types of bacteria must be artificially bred or grown under conditions described herein to obtain a preferred strain which exhibits a satisfactory tolerance to vanadium and/or uranium.

In obtaining a preferred strain for use in practicing the invention, the bacteria are artificially grown over many generations to the appropriate tolerance for uranium and/or vanadium values. This may be accomplished by growing a culture of the bacteria in a culture medium containing uranium values and/or vanadium values, which is synthetic in nature and tolerated by the bacteria initially. By gradually building up the concentration in the culture medium of the uranium values and/or vanadium values, and if desired other substances which are present in the leach liquor to be oxidized, it is possible to obtain a strain of bacteria which is satisfactory for practicing the present invention. Soluble compounds of uranium and/or vanadium may be added to the culture medium in small amounts gradually over a period of many weeks, until the bacteria have the desired degree of tolerance. When no uranium or vanadium values are present in the solution and ferrous values only are to be oxidized, then the bacteria need not be tolerant to uranium or vanadium values. However, when uranium and/or vanadium values are present in addition to iron values, then tolerance must be obtained to the substances present.

The bacteria readily develop a tolerance to substantial levels of vanadium such as 0.1–0.5 g./l. of $V_2O_5$. It also may be possible to develop a tolerance to very high levels such as 1, 5, 10, 15 or 20 g./l. of vanadium when calculated as $V_2O_5$. In many instances, it is only necessary to obtain a strain of bacteria which is tolerant to 0.4–0.5 g./l. of $V_2O_5$ or less.

Normally, a tolerance to uranium between about 0.2 g./l. and up to about 1–2 g./l. of $U_3O_8$ is satisfactory since relatively dilute uranium solutions are encountered in practice. When desired, it also may be possible to develop a tolerance to high concentrations of uranium such as 5–15 or 20–25 g./l. when calculated as $U_3O_8$. The bacteria are naturally tolerant to high concentrations of iron such as 5–10 to 20–25 g./l. A tolerance to other metal values which may be present in the leach solution to be oxidized also may be developed such as 15,000–20,000 p.p.m. (parts per million) of zinc, 10,000–15,000 p.p.m. of copper, 5,000–10,000 p.p.m. of aluminum, 100–200 p.p.m. of molybdenum, 3,000–4,000 p.p.m. of manganese, 5,000–10,000 p.p.m. of calcium and 2,000–3,000 p.p.m. of magnesium. The bacteria seem to tolerate the usual concentrations of alkali metals encountered in practice without any difficulty.

It is also possible to grow a strain of bacteria which is tolerant to the conditions under which the bacteria are to be used such as the temperature and pH of the solution to be oxidized. The bacteria may be grown over successive generations to tolerate desired conditions of temperature and pH in a manner analogous to developing tolerance to uranium and/or vanadium. Care is taken to first use temperature and pH conditions which the growing bacteria will tolerate, and then the conditions are changed gradually over a long period of time toward those under which it is desired to operate.

The aqueous medium containing the iron and/or vanadium values to be oxidized should be maintained at a temperature above the freezing point and not greater than about 50° C. Normally, the operating temperature will range between about 0° C. and about 50° C., but the preferred temperature range for practical operation is usually between about 15° C. and 40° C. Best results are obtained at about 35° C. in most instances.

The leach liquor containing the ferrous ion and/or plus 4 vanadium to be oxidized must be acidic. However, wide variations in pH are possible when the bacteria are grown to establish a desired degree of tolerance. The bacteria are very active at pH levels as low as about 0.8–.9, and as high as about 3. In most instances, a pH range between about 1.1–1.2 and 2.6–2.8 is preferred.

It is usually possible to have the oxidation proceed at a pH of about 1.5±0.2 when it is desired to maintain the oxidized metal values in solution. However, in instances where it is desirable to precipitate the oxidized metal values from solution as the oxidation proceeds, then a pH of about 2.5±0.3 usually is preferred.

The bacteria are allowed to multiply and grow within the acidic aqueous media containing ferrous iron and/or vanadium values to be oxidized under the abovementioned conditions of temperature and pH. Normally the bacteria will multiply in leach liquors to provide a suitable concentration for the oxidation to proceed at a satisfactory rate, but better results may be obtained by adding nutrients and especially a source of nitrogen such as a nitrate or ammonium salt. For instance, alkali metal nitrates or ammonium mineral acid salts may be added in quantities to provide about 1–200 p.p.m. (parts per million) of nitrogen in the resulting solution. About 0.1–0.25 g./l. of ammonium sulfate has been found to be very satisfactory as a source of nitrogen. It is also desirable in some instances to add traces of soluble salts of metals such as cobalt, magnesium and manganese. Most leach liquors contain phosphorus, potassium and other substances necessary for growth of the bacteria and they need not be added. In instances where a specific solution fails to contain elements essential for growth of the bacteria, it is understood that they are added.

It has been discovered that the oxidation rate may be increased markedly by passing an elemental oxygen-containing gas into the solution as the oxidation proceeds. In instances where carbon dioxide is not present in the solution in sufficient amount, then the elemental oxygen-containing gas also should contain carbon dioxide as the bacteria normally depend upon it for a source of carbon. Usually air is preferred and for best results the aeration should be vigorous and often sufficiently vigorous to agitate the solution as well as maintain it substantially saturated with respect to oxygen.

The oxidation rate may be further improved by providing a satisfactory support for the multiplying and growing microorganisms. Satisfactory supporting materials include volcanic rock or other suitable rocks, and inert materials in general which provide an extended surface area. It is possible to use inert materials which are sufficiently finely divided or light in weight to be suspended in the leach liquor, whether by agitation or due to low specific gravity, and thereby provide a mobile support in particulate form for the microorganisms. This has the advantage of allowing the oxidized metal values to precipitate on the moving particles and thereby prevent the particles from being cemented together by deposited substances as the oxidation proceeds. A mobile, particulate support is especially desirable in the oxidation of vanadium values at a pH of about 2.5 to 3, as the vanadium is precipitated on the particles as iron vanadate. In instances where the support is stationary such as a bed of rock, the rocks are cemented together by precipitated material and eventually the flow of liquid through the bed is reduced or even prevented. The material precipitated during the oxidation may contain iron in the ferric oxidation state and vanadium in the plus 5 oxidation state, and it may be dissolved in strong mineral acid and then recycled to the leaching step to recover the oxidant value.

The oxidation of the ferrous and/or plus 4 vanadium values may be allowed to proceed for any satisfactory period of time sufficient to accomplish the desired degree of oxidation. In instances where both ferrous iron and plus 4 vanadium are to be oxidized, the oxidation is allowed to proceed until all of the ferrous iron is oxidized to the ferric state, and the plus 4 vanadium is then oxidized to the plus 5 oxidation state. When a portion or all of the ferrous iron is to be oxidized to the ferric state, then the oxidation is allowed to proceed for such period of time as is sufficient to achieve the desired degree of ferrous iron oxidation. If only the iron is to be oxidized, then the oxidation may be allowed to proceed to a negative E.M.F. (electromotive force) of about —500 mv. (millivolts). When the vanadium as well as the iron is to be oxidized, then the oxidation may be continued until the E.M.F. is —600 mv., or a higher negative value such as —650 mv. In the specification and claims, it is understood that the E.M.F. measurements are made with platinum vs. calomel electrodes at a pH value of 0.5 to 1.5.

Normally the aqueous mineral acid to be contacted with the uranium ore has a pH value of 0.5 or less, and under these conditions the bacteria are inactivated or killed. Thus, in accordance with the present invention the initial aqueous mineral acid is contacted either with sufficient ore to increase the pH value to 0.8–0.9 or higher, or the leach liquor is neutralized or diluted to provide such a pH level prior to contacting with the bacteria. Preferably, the aqueous mineral acid is contacted with sufficient ore to provide a leach liquor having a pH value within the desired range, and then the leach liquor may be fed to a bed of rocks or other support for the growing bacteria. The leach liquor may be vigorously agitated with air during passage through the support to thereby rapidly oxidize the ferrous ion to ferric ion. After the oxidation step is completed, normaly the iron content is in the ferric state and if vanadium is present it may be in the plus 5 oxidation state. Sufficient concentrated mineral acid to provide the necessary pH of about 0–0.5 for the leaching step may be added to the oxidized leach liquor, and then it is passed to the leaching step and contacted with uranium ore. Addition of mineral acid to adjust the pH to 0–0.5 kills or inactivates the bacteria, but inasmuch as the iron and vanadium values have been oxidized, this does not adversely affect the leaching step.

All or a portion of the leach liquor may be oxidized in the presence of the dissolved uranium values, the pH adjusted by addition of acid, and then recycled to the leaching step to solubilize additional uranium and provide a more concentrated leach liquor. It is also possible to recover the uranium values from the leach liquor by prior art practices such as solvent extractions or ion exchange, and then oxidize the uranium-barren solution and recycle it to the leaching step. The uranium-barren solution contains substantial amounts of ferrous ion and/or reduced vanadium values, and a highly effective leaching solution is provided upon biological oxidation and adjustment of pH by addition of concentrated acid. The above practices result in a substantially lower water requirement and they are especially desirable in instances where the water supply is restricted, as is true of some of the southwestern portions of the United States where uranium ore is processed.

The present invention also provides a continuous process whereby a portion of the leach liquor may be recycled and a portion passed to uranium recovery. Normally, up to about 50% of the leach liquor is recycled in the continuous process, and preferably about 10–25% in instances where impurities tend to concentrate to a substantial degree.

The invention is especially useful in the processing of uranium ores containing a substantial amount of lime or other basic constituents as the leach liquor is rapidly neutralized from an initial pH value of 0–0.5 to a higher pH value at which the microorganisms thrive. The leach liquor may be passed through the ore until the desired pH level for biological oxidation is reached, and then all or a portion of the leach liquor may be biologically oxidized, the pH adjusted with concentrated acid and recycled to the leaching circuit.

The foregoing detailed description and the following specific examples are for purposes of illustration only, and are not intended as being limiting to the spirit or scope of the appended claims.

*Example I*

The leach liquor used in this example was obtained by conventional sulfuric acid leaching of a carbonaceous uranium ore of the Ambrosia Lake type. The leach liquor contained 1 g./l. of uranium values calculated as $U_3O_8$, 0.3 g./l. of tetravalent vanadium values when calculated as $V_2O_5$, 0.5 g./l. of ferric iron values calculated as Fe, 2.5 g./l. of ferrous iron values calculated as Fe, 0.3 g./l. of phosphate values calculated as $P_2O_5$, 8 g./l. of aluminum values calculated as $Al_2O_3$, and 1 g./l. of dissolved or colloidally dispersed silica calculated as $SiO_2$.

The bacteria used in this example was a strain artificially bred to tolerate the presence of vanadium and uranium values and other constituents of the above-identified leach liquor. The strain was developed from naturally occurring oxidizing bacteria obtained from copper and iron-containing mine waters found in the Brainard Lake area and the Idaho Springs area of Colorado. The original bacteria were unable to thrive and multiply rapidly in the leach liquor. However, after growing successive generations of the bacteria in acidic aqueous media containing lower concentrations of the various constituents of the leach liquor, followed by gradually increasing the concentrations of the constituents over a long period of time, it was possible to arrive at a strain of bacteria which was capable of rapidly oxidizing both iron and vanadium values over a pH range of about 0.8 to 3 and at a temperature of 15° C. to 40° C. It was this strain of artificially bred bacteria that was used in this example.

The bacteria used in this example were non-spore forming, rod-shaped, motile, autotrophic, oxidizing bacteria. They appeared to be identical with bacteria usually identified as *Thiobacillus ferrooxidans* or *Ferrobacillus ferrooxidans* with the exception of having the ability to grow and thrive in the above-identified leach liquor, and the ability to oxidize the ferrous iron values and vanadium values contained therein to the ferric and plus 5 valence states, respectively, in a practical period of time.

A vat was partially filled with volcanic rock, and then charged with the leach liquor. Then, a culture of the strain of bacteria identified above was charged to the vat. The leach liquor was aerated vigorously and the electromotive force (E.M.F.) recorded periodically. The pH of the leach liquor was about 2.0.

The negative E.M.F. gradually rose and when it reached approximately —500 to —550 millivolts, substantially no ferrous ion was found to be present in the solution. Thus, the ferrous ion had been substantially completely oxidized to ferric ion. At this time, very little if any vanadium was oxidized from the plus 4 to the plus 5 oxidation state. The oxidation was allowed to continue until the E.M.F. reached —600 millivolts. At that time, it will found that substantially all of the vanadium values were in the plus 5 oxidation state. The pH value of the oxidized leach liquor is adjusted to 0.1 by addition of concentrated sulfuric acid, and then it is recycled to the leaching step and contacted with an additional portion of the uranium ore to thereby solubilize additional uranium values, in substantially the same amount as was previously solubilized.

*Example II*

A series of columns are packed with a carbonaceous uranium ore of the Ambrosia Lake type and aqueous sulfuric acid containing ferric ion and having a pH of 0.1 initially is passed successively through the series of columns. The leach liquor withdrawn from the last column in the series has a pH of about 1.5 and contains solubilized uranium and vanadium values. The iron values are largely present in the ferrous oxidation state and the vanadium in the plus 4 oxidation state.

About half of the leach liquor from the last column in the series is biologically oxidized using the bacteria and following the procedure of Example I until substantially all of the iron is in the ferric oxidation state and substantially all of the vanadium is in the plus 5 oxidation state. The pH value of the leach liquor is then adjusted to 0.1 by addition of concentrated sulfuric acid and recycled to the first column in the series to solubilize additional uranium values.

The remaining leach liquor is passed to a solvent extraction step wherein it is contacted with a uranium solvent extractant to recover the uranium values. Thereafter, the uranium-barren leach liquor is oxidized following the procedure of Example I as it still contains the ferrous iron values and plus 4 vanadium values, the pH value adjusted to 0.1 by addition of concentrated sulfuric acid and then contacted with additional uranium ore. The resulting pH adjusted oxidized liquor is an excellent leach solution and solubilized the uranium values effectively.

*Example III*

The procedure of Example II is repeated with the exception of using a uranium ore which does not contain vanadium, and the resulting vanadium-free leach liquor is oxidized and recycled for the solubilization of additional uranium values. Substantially the same results are obtained as in Example II, with the exception of more ferric ion being necessary to oxidize a given quantity of the uranium due to the absence of the plus 5 vanadium as an oxidant.

*Example IV*

The leach liquor and strain of bacteria of this example are the same as those employed in Example I.

A series of vats are prepared and filled with volcanic rocks. Then, leach liquor at a pH of 2.6 and a temperature of 35° C. is passed continuously and successively through the series of vats. The vats are inoculated with the strain of bacteria of Example I and aerated vigorously during the oxidation.

The ferrous ion and tetravalent vanadium values are oxidized to ferric ion and pentavalent vanadium values and iron vanadate is precipitated on the rocks together with small amounts of calcium sulfate. With continued operation, the rocks are coated and cemented together by the precipitate and the rock bed resists the flow of the leach liquor. At this point, the vats are drained and the iron vanadate precipitate is removed from the rocks by contacting with strong sulfuric to thereby provide a sulfuric acid solution containing 15–18 gms./liter of pentavalent vanadium values calculated as $V_2O_5$ and ferric ion.

The oxidized solution withdrawn from the vats contains some ferric ion and pentavalent vanadium values and it may be recycled to the leaching step upon addition of makeup sulfuric acid. If desired, the strong sulfuric acid solution containing the dissolved iron vanadate may be used in adjusting the pH of the oxidized liquor to be recycled or it may be used in preparing fresh aqueous sulfuric acid for leaching.

It is possible to discard a portion or even all of the oxidized liquor withdrawn from the vats without discarding large amounts of ferric ion and vanadium values as much of the ferric ion and vanadium values are precipitated on the rocks. Addition of the sulfuric acid solution of iron vanadate to the recycled leach liquor allows the vanadium values to be concentrated in recycled leach liquor without losing substantial amounts of the vanadium.

The procedure of this example is also effective when the leach liquor is not recycled, and the sulfuric acid solution of iron vanadate is used in fresh leach liquor. This provides ferric ion and pentavalent vanadium values as oxidants for the uranium values, and also allows the vanadium content of the leach liquor to be concentrated for subsequent recovery.

What is claimed is:

1. A process for solubilizing uranium values comprising intimately contacting solid uranium-bearing material with aqueous sulfuric acid containing dissolved iron values present in solution as ferric ion, at least a portion of the uranium values being solubilized and ferric ion being reduced to ferrous ion while contacting the uranium-bearing material with the aqueous sulfuric acid to thereby produce an aqueous solution containing dissolved uranium values and ferrous ion, contacting at least a portion of the said aqueous solution containing the dissolved uranium values and ferrous ion with an effective quantity of live non-spore forming, rod-shaped, motile, autotrophic oxidizing bacteria to oxidize ferrous ion to ferric ion and produce an aqueous solution containing dissolved uranium values and ferric ion, the aqueous solution having a pH value of about 0.8 to 3.0 and a temperature of about 0° C. to 50° C. when contacted with the bacteria, the bacteria being tolerant to the said aqueous solution containing the dissolved uranium values and ferrous ion when contacted therewith and capable of oxidizing the ferrous ion to ferric ion, adding sulfuric acid to the said aqueous solution of dissolved uranium values and ferric ion to lower the pH value and produce an aqueous sulfuric acid solution containing dissolved ferric ion produced by the bacterial oxidation of the ferrous ion, and contacting solid uranium-bearing material with the said aqueous sulfuric acid solution having present therein dissolved ferric ion produced by the bacterial oxidation of the ferrous ion to thereby solubilize additional uranium values.

2. The process of claim 1 wherein the aqueous solution containing ferrous ion is subjected to aeration while contacted with the bacteria.

3. The process of claim 1 wherein the aqueous solution containing ferrous ion is oxidized by the bacteria to a negative E.M.F. of at least —500 millivolts and substantially all of the ferrous ion is oxidized to ferric ion.

4. The process of claim 1 wherein the aqueous solution containing ferrous ion has a temperature between about 15° C. and 40° C., and it is subjected to aeration and oxidized to a negative E.M.F. of at least —500 millivolts while contacted with the bacteria.

5. The process of claim 1 wherein free sulfuric acid is added to the aqueous solution after oxidation of ferrous ion to ferric ion by the bacteria to adjust the pH value.

6. The process of claim 1 wherein the said aqueous solution containing dissolved uranium values and ferrous ion also contains vanadium values, the vanadium values are initially in the plus 4 oxidation state and are oxidized to the plus 5 oxidation state when contacting the said aqueous solution with the bacteria, and the resultant vanadium values in the plus 5 oxidation state are present in the said aqueous sulfuric acid solution having present therein dissolved ferric ion produced by the bacterial oxidation of the ferrous ion to thereby aid in solubilizing additional uranium values.

7. A process for leaching uranium ore comprising intimately contacting uranium ore with aqueous sulfuric acid containing iron values to solubilize uranium values and produce leach liquor containing dissolved uranium values, the aqueous sulfuric acid initially having a pH value not greater than 0.5 and containing ferric ion in solution which is at least partially reduced to ferrous ion while contacting the ore, contacting at least a portion of the said leach liquor containing dissolved uranium values and ferrous ion with an effective quantity of live-non-spore forming, rod-shaped, motile, autotrophic oxidizing bacteria to oxidize ferrous ion to ferric ion, the bacteria being tolerant to the leach liquor when contacted therewith and capable of oxidizing ferrous ion to ferric ion, at least a portion of the ferrous ion present initially in the leach liquor being oxidized to ferric ion by the bacteria to thereby produce a leach liquor containing dissolved uranium values and ferric ion, the leach liquor having a pH value between about 0.8 and 3 and a temperature between about 0° C. and 50° C. when contacted with the bacteria, adding sulfuric acid to the said leach liquor after oxidation of ferrous ion to ferric ion by the bacteria in an amout to adjust the pH to a value not greater than 0.5, and contacting uranium ore with the said pH adjusted leach liquor containing dissolved ferric ion produced by the bacterial oxidation of the ferrous ion to thereby solubilize additional uranium values.

8. The process of claim 7 wherein the leach liquor is subjected to aeration while contacted with bacteria growing on a solid support and oxidized to a negative E.M.F. of at least —500 millivolts.

9. The process of claim 7 wherein uranium values are recovered from at least a portion of the leach liquor prior to the oxidation of the ferrous ion by the bacteria.

10. The process of claim 7 wherein the aqueous sulfuric acid is contacted with uranium ore until the pH value is increased to about 0.8–3 prior to contacting with the bacteria.

11. The process of claim 7 wherein the said leach liquor contacted with the bacteria also contains vanadium values initially in the plus 4 oxidation state, vanadium values are oxidized to the plus 5 oxidation state by the bacteria, and the resultant vanadium values in the plus 5 oxidation state are present in the pH adjusted leach liquor containing the ferric ion produced by the bacterial oxidation of the ferrous ion to thereby aid in solubilizing additional uranium values.

References Cited by the Examiner

UNITED STATES PATENTS 2,829,964   4/1958   Zimmerly et al.

OTHER REFERENCES

Clegg et al., Uranium Ore Processing (1958), pp. 119–123.

Metals Handbook, The American Society for Metals, 1948 Edition, pp. 755–759.

LEON D. ROSDOL, *Primary Examiner.*

REUBEN EPSTEIN, CARL D. QUARFORTH,
*Examiners.*

J. D. VOIGHT, L. A. SEBASTIAN, *Assistant Examiners.*